(12) United States Patent
Saucray

(10) Patent No.: US 10,894,596 B2
(45) Date of Patent: Jan. 19, 2021

(54) WINGLET EQUIPPED WITH A CONFIGURATION CHANGING DEVICE WITH LOW ENERGY CONSUMPTION, AIRCRAFT COMPRISING SAID WINGLET

(71) Applicant: Airbus Operations SAS, Toulouse (FR)

(72) Inventor: Jean-Michel Saucray, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 318 days.

(21) Appl. No.: 16/134,302

(22) Filed: Sep. 18, 2018

(65) Prior Publication Data
US 2019/0084667 A1    Mar. 21, 2019

(30) Foreign Application Priority Data

Sep. 19, 2017  (FR) ...................... 17 58660

(51) Int. Cl.
| | |
|---|---|
| *B64C 23/06* | (2006.01) |
| *F03G 7/06* | (2006.01) |
| *B64C 13/28* | (2006.01) |
| *B64C 3/48* | (2006.01) |
| B64C 3/54 | (2006.01) |

(52) U.S. Cl.
CPC ............. *B64C 23/072* (2017.05); *B64C 3/48* (2013.01); *B64C 13/28* (2013.01); *F03G 7/065* (2013.01); *B64C 2003/543* (2013.01)

(58) Field of Classification Search
CPC .......... B64C 23/072; B64C 13/36; B64C 3/48
See application file for complete search history.

(56) References Cited

U.S. PATENT DOCUMENTS

| | | | | |
|---|---|---|---|---|
| 1,888,418 | A |  | 11/1932 | Adams |
| 5,988,563 | A | * | 11/1999 | Allen ....................... B64C 3/56 244/49 |
| 10,214,278 | B2 | * | 2/2019 | Briancourt ............ B64C 23/072 |
| 10,464,658 | B2 | * | 11/2019 | Harding ................... B64C 3/56 |
| 2016/0244153 | A1 |  | 8/2016 | McMahon et al. |
| 2017/0021918 | A1 |  | 1/2017 | Da Silva et al. |
| 2018/0354605 | A1 | * | 12/2018 | Cross ................. B64D 45/0005 |

FOREIGN PATENT DOCUMENTS

GB         299212 A      10/1928

OTHER PUBLICATIONS

French Search Report; priority document.

* cited by examiner

*Primary Examiner* — Brian M O'Hara
(74) *Attorney, Agent, or Firm* — Greer, Burns & Crain, Ltd.

(57) ABSTRACT

A winglet linked to a wing of an aircraft and equipped with a configuration changing device, the winglet being configured to be deformed elastically between a first configuration in the absence of an activation loading and a second configuration in the presence of an activation loading. The configuration changing device comprises at least one blocking cable configured to hold the winglet in the second configuration and at least one blocking system which comprises a tank containing a material configured to occupy a solid state in which the material immobilizes the blocking cable and a liquid state in which the material does not immobilize the blocking cable and allows the displacement thereof. An aircraft comprises wings provided with the winglets.

14 Claims, 2 Drawing Sheets

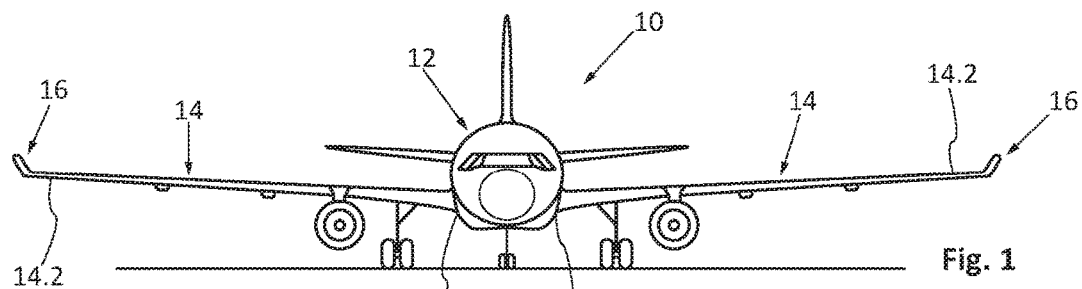
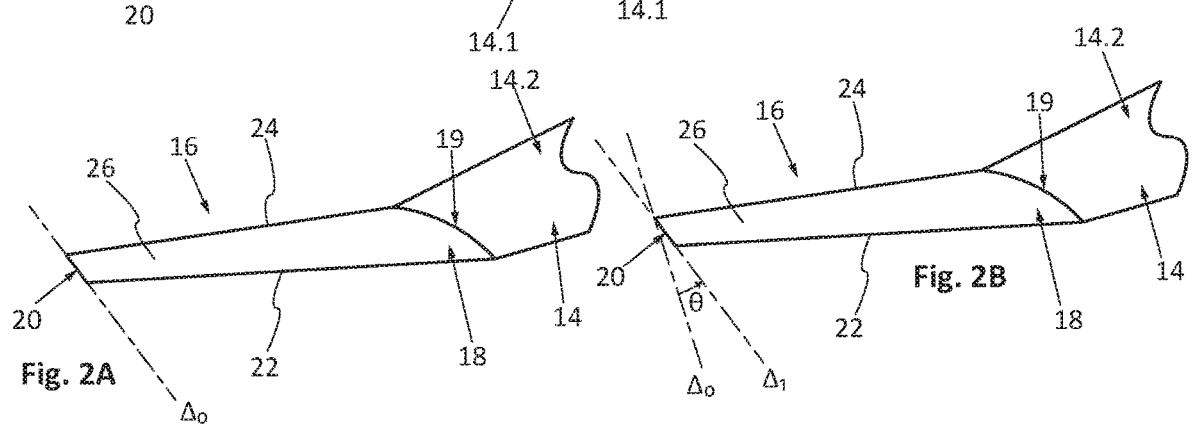
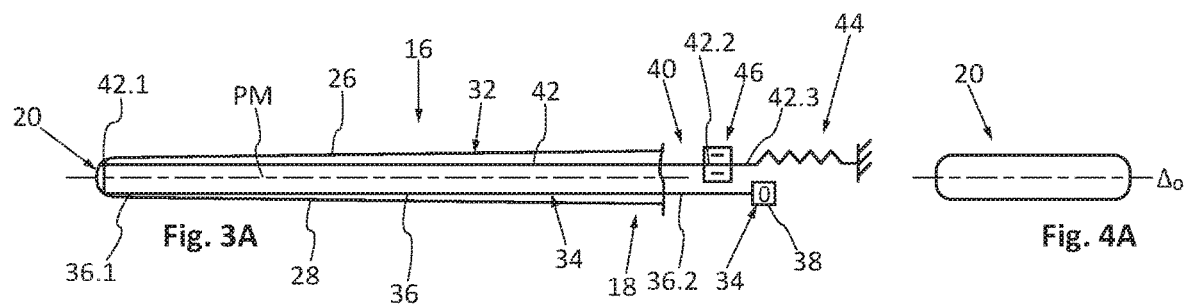
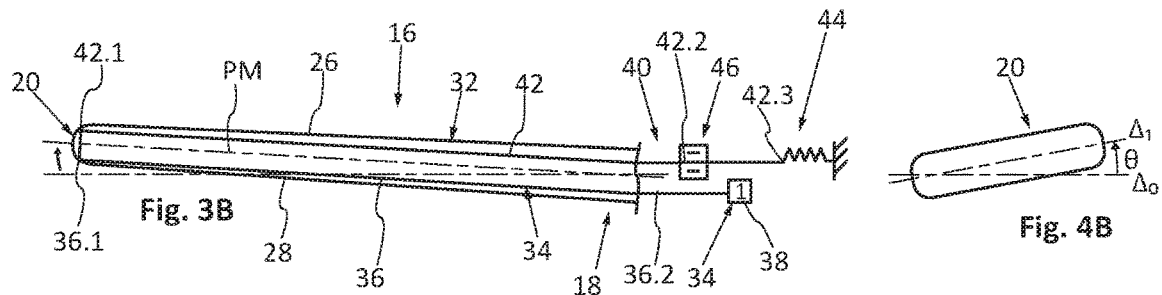
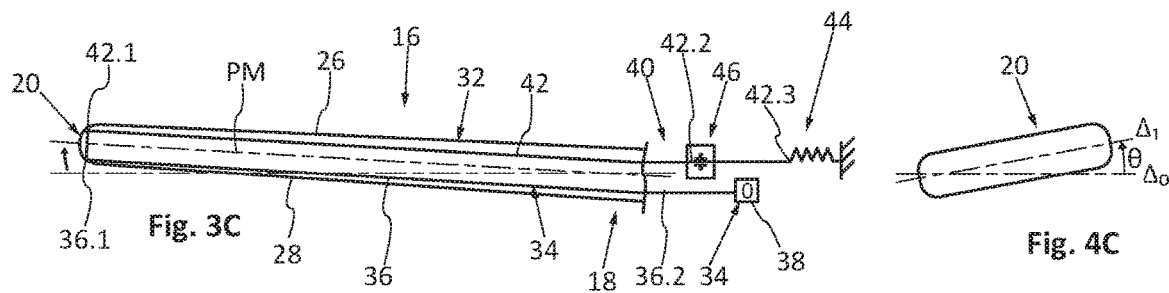

WINGLET EQUIPPED WITH A CONFIGURATION CHANGING DEVICE WITH LOW ENERGY CONSUMPTION, AIRCRAFT COMPRISING SAID WINGLET

CROSS-REFERENCES TO RELATED APPLICATIONS

This application claims the benefit of the French patent application No. 1758660 filed on Sep. 19, 2017, the entire disclosures of which are incorporated herein by way of reference.

BACKGROUND OF THE INVENTION

The present application relates to a winglet equipped with a configuration changing device with low energy consumption and an aircraft comprising the winglet.

To reduce the energy consumption, aircraft generally have, at the ends of their wings, winglets, also called "tip fences," used to reduce the drag of the wings, particularly in cruising phase.

Structurally, the winglet comprises an internal structure and a skin, added onto the internal structure, which is generally formed by a number of juxtaposed panels.

According to a first configuration, each winglet is fixed and extends in a plane which forms an angle greater than 45° with the plane of the wing, the angle and the form of the winglet being optimized to reduce the drag of the wing in cruising phase. However, this first configuration causes the wing to be overloaded in certain circumstances (extreme turbulence conditions, maneuvers), which impacts the structural dimensioning of the wing and consequently the weight thereof.

To remedy this drawback, solutions have been proposed for making the winglets mobile or deformable in order to allow them to occupy a first state in which each winglet forms an angle with the wing that is optimized in order to reduce the drag of the wing in cruising phase and a second state in which each winglet is arranged approximately in the eye of the wind (direction from which the wind is coming) thus limiting the overloading of the wing in certain flight phases.

Among these solutions, according to a first embodiment, each winglet is mobile and linked to the wing by a hinge or a runner. In addition, at least one actuator is provided to control the movement of the winglet. This first embodiment is not fully satisfactory primarily because of its weight which is significant.

According to a second embodiment, the winglet can be deformed. Its skin is then configured to be deformed elastically and its internal structure can be deformed elastically or include at least one articulation. In addition, at least one actuator of piezoelectric or shape memory type is provided to deform and keep deformed the internal structure and thus the winglet. This second embodiment is not fully satisfactory primarily because of a significant energy consumption.

The present invention aims to remedy the drawbacks of the prior art.

SUMMARY OF THE INVENTION

To this end, a subject of the invention is a winglet linked to a wing of an aircraft and equipped with a configuration changing device, the winglet being configured to be deformed elastically between a first configuration in the absence of an activation loading and a second configuration in the presence of an activation loading, the configuration changing device comprising:

an activation mechanism configured to occupy a non-activated state in which it exerts no loading on the winglet and an activated state in which it exerts the activation loading so as to deform the winglet from the first configuration to the second configuration, and a holding mechanism configured to hold the winglet in the second configuration.

According to the invention, the holding mechanism comprises:

at least one blocking cable which has a first anchoring point linked to the winglet, at least one blocking system passed through by the blocking cable and configured to occupy a free state in which it does not immobilize the blocking cable and a blocked state in which it immobilizes the blocking cable, the first anchoring point and the blocking system being positioned in such a way that the blocking cable stretched between the first anchoring point and the blocking system is configured to hold the winglet when the latter occupies the second configuration, the blocking system comprising a tank containing a material having a melting point and configured to occupy a solid state, when the temperature of the material is lower than the melting point, in which it immobilizes the blocking cable which corresponds to the blocked state of the blocking system and a liquid state, when the temperature of the material is higher than the melting point, in which it does not immobilize the blocking cable and allows the displacement thereof which corresponds to the free state of the blocking system.

According to the invention, each winglet can occupy two configurations suited to different flight conditions, a first configuration in which the winglet is not deformed and a second configuration in which the winglet is deformed elastically and, for each winglet, a configuration changing device making it possible to hold the winglet in the deformed state without the input of energy.

According to another feature, the material is chosen such that the melting point is lower than an atmospheric temperature on the ground and higher than an atmospheric temperature at an altitude of the aircraft during a cruising phase of the flight.

According to another feature, the material present in the tank and the blocking cable are configured in such a way that a shear breaking stress between the material and each blocking cable is gauged so as to obtain a switching of the winglet from the second configuration to the first configuration when a loading of the wing of the aircraft exceeds a given threshold.

According to one embodiment, the material is atmospheric ice and the holding mechanism comprises two blocking cables which each have a diameter of the order of 3 mm and a length immersed in the material of the order of 100 to 150 mm. In this document, "of the order of" means "+/−20% of the number specified."

According to another feature, the holding system comprises an activation system configured to provoke the melting of the material.

According to another feature, the holding mechanism comprises a tensioning system for each blocking cable.

According to a first variant, the activation mechanism comprises at least one element with shape memory that can be activated by Joule effect configured to occupy a non-deformed state and a deformed state in which it generates the activation loading and at least one electrical power supply configured to deliver an electrical energy to the element with shape memory to provoke a switch from the non-deformed state to the deformed state.

According to one embodiment, at least one blocking cable is inserted into one of the elements with shape memory.

According to one embodiment, at least one blocking cable follows a different run from the element (or elements) with shape memory.

According to a second variant, the configuration changing device comprises, for each blocking cable, an actuator linked to the second end of the blocking cable, positioned opposite the first anchoring point relative to the blocking system and configured to pull on the blocking cable.

According to another feature, the configuration changing device comprises a controller for coordinating the activation mechanism configured to deform the winglet and the holding mechanism configured to hold the winglet in the deformed state.

According to another feature, the controller is configured to automatically and independently trigger a change of configuration of the winglet as a function of a value of at least one criterion of loading of each wing.

An aircraft comprising wings each provided with at least one winglet according to the invention is also a subject of the invention.

BRIEF DESCRIPTION OF THE DRAWINGS

Other features and advantages will emerge from the following description of the invention, the description being given purely by way of example, in light of the attached drawings in which:

FIG. 1 is a front view of an aircraft,

FIGS. 2A and 2B are perspective views of an end of a wing respectively occupying two different configurations, FIGS. 3A to 3C are diagrams which illustrate a winglet respectively in a first configuration, upon its deformation, and in a second configuration, FIGS. 4A to 4C are side views of the end of the winglet respectively in a first configuration, upon its deformation, and in a second configuration.

DETAILED DESCRIPTION OF THE PREFERRED EMBODIMENTS

Figures 5A, 5B:
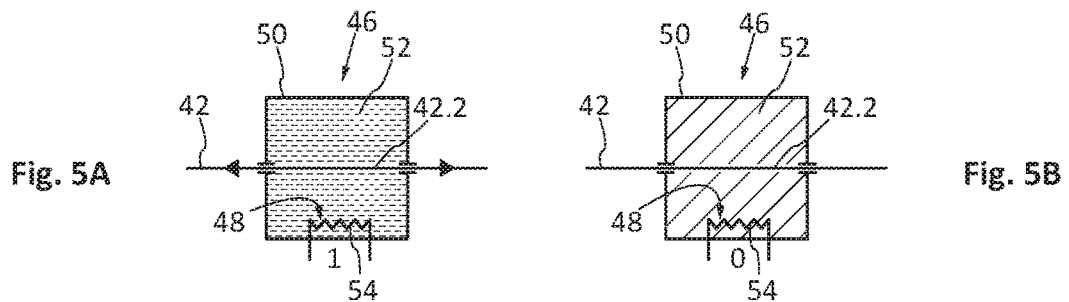
FIGS. 5A and 5B are diagrams which illustrate a blocking system respectively in the free state and in the blocked state.

In FIG. 1, an aircraft 10 is represented which comprises, among other things, a fuselage 12 and two wings 14 which extend on either side of the fuselage 12.

Each wing 14 comprises a first end 14.1 linked to the fuselage and a second end 14.2 provided with at least one winglet 16, a leading edge and a trailing edge. The plane which passes approximately through the leading and trailing edges is called plane of the wing.

Geometrically, each winglet 16 comprises a first end 18 linked to the wing 14 by a junction 19, a free second end 20, a leading edge 22, a trailing edge 24, a top face 26 and a bottom face 28 which link the leading edge 22 and the trailing edge 24.

The plane which passes approximately through the leading and trailing edges is called plane of the winglet.

Structurally, each winglet 16 comprises an internal structure 30 (visible in FIGS. 6 and 7) and a skin 32 added onto the internal structure which delimits the top and bottom faces 26 and 28.

According to one embodiment, the internal structure 30 comprises a front stringer 30.1 and a rear stringer 30.2 linked by ribs (not represented) and the skin 32 which comprises several juxtaposed panels linked to the internal structure 30.

Each winglet 16 is configured to occupy at least two different configurations. For the present description, a configuration of the winglet is characterized by the dimensions of the winglet, the shape of the winglet which can be planar, curved, twisted or the like, and/or the position of the winglet relative to the wing.

As illustrated in FIG. 2A, in a first configuration, the winglet is configured to optimize the load of the wing in certain flight circumstances, such as, for example, during maneuvers, during take-off, during landing and/or in extreme turbulence conditions.

According to one embodiment, in the first configuration, the winglet 16 is disposed in the eye of the wind, the plane of the winglet $\Delta 0$ and the plane of the eye of the wind being approximately coplanar.

As illustrated in FIG. 2B, in a second configuration, the winglet is configured to optimize the drag of the wing, particularly during the cruising phase of the flight.

According to one embodiment, in the second configuration, the plane of the winglet $\Delta 1$ forms a twist of angle $\theta$ of a few degrees with the plane of the winglet $\Delta 0$ in the first configuration. Obviously, the invention is not limited to the capacity to generate the modification of the twist between the first and second configurations, all the shape parameters of the winglet such as the angle between the plane of the winglet and the plane of the wing, the thickness of the profile of the winglet, the camber of the profile of the winglet, the flexing of the winglet and the variation of these parameters along the wing span will be able to be modified according to the needs expressed by the state of the art of aero-elastic optimization, these movements and deformations being generated by the activation loading as described hereinbelow.

The winglet 16 is configured to be deformed elastically between the first configuration and the second configuration.

Elastic deformation is understood to mean a reversible deformation. Thus, a structure or a part which has an initial configuration in the absence of a loading, can be deformed so as to occupy a deformed configuration when at least one loading is applied to it and reverts to its initial configuration when the loading is no longer applied.

The median plane of the winglet PM is understood to be a plane which does not undergo an elongation or a contraction when the winglet is deformed elastically.

Hereinafter in the description, the loading that makes it possible to switch the winglet from the first configuration to the second configuration is called activation loading. The activation loading is separated from the median plane PM. It can be a flexural or torsional loading or a combination of the two and also include pulling and compression loading components.

According to a particular feature of the invention, the winglet 16 is configured to occupy the first configuration in the absence of activation loading.

Structurally, the winglet 16 can be designed like that of the second embodiment of the prior art. Thus, the internal structure 30 and the skin 32 occupy the first configuration in the absence of activation loading and are deformed elastically to occupy the second configuration in the presence of the activation loading.

The winglet 16 is equipped with a configuration changing device which comprises at least one activation mechanism 34 configured to occupy a non-activated state (visible in FIGS. 3A, 4A, 3C, 4C) in which it exerts no loading on the winglet 16 and an activated state (visible in FIGS. 3B, 4B) in which it exerts the activation loading on the winglet 16.

According to a first variant, the activation mechanism 34 comprises at least one actuator, such as a cylinder, for example, which has anchoring points positioned appropriately to generate the activation loading on the winglet 16.

According to a second variant, the activation mechanism comprises at least one cable having a first end, linked to the internal structure 30 and/or to the skin 32 of the winglet 16, and a second end linked to an actuator configured to exert a pulling force on the cable, the cable running inside the winglet 16 and the first and second ends being positioned appropriately to generate the activation loading.

According to a third variant, the activation mechanism 34 comprises at least one element with shape memory 36 configured to occupy an initial state (not deformed) and a deformed state when it is activated. Preferably, each element with shape memory 36 can be activated by Joule effect. Alternatively, the element with shape memory will be able to be activated by direct heating, for example between a resistor and the element with shape memory.

According to one embodiment, the element with shape memory 36 is wire-shaped. It comprises several cables made of material with shape memory arranged so as to form a blanket or a loom.

According to a first example, the element with shape memory 36 is a cable loom having a diameter of 12 mm. According to a second example, the element with shape memory 36 is a blanket of cables which has a transverse section of 30 mm×4 mm. This second example makes it possible to generate a force of 1200 DaN (12000 Newtons) over several tens of thousands of cycles. The cables can be positioned on either side of the working section of the front stringer 30.1, of the rear stringer 30.2, of the front and rear stringers and/or transversely between the front and rear stringers depending on the activation loading desired.

The wire-shaped element with shape memory 36 comprises a first end 36.1 linked to the winglet and positioned in proximity to the free second end 20 of the winglet, and a second end 36.2 positioned in proximity to the junction 19 linking the winglet 16 to the wing 14. The positions of the first and second ends 36.1 and 36.2 are determined as a function of the activation loading desired and of the structural and aero-elastic optimization of the winglet 16.

A longilinear element with shape memory 36 makes it possible to limit the embedded mass. Thus, in the case of a blanket of cables, the element with shape memory 36 has a mass of the order of magnitude of a kilogram for a length of the order of 2 m.

In addition to the element (or elements) with shape memory 36 that can be activated by Joule effect, the activation mechanism 34 comprises at least one electrical power supply 38, linked to each element with shape memory 36 that can be activated by Joule effect, configured to occupy a rest state in which it does not supply electrical energy and an activated state in which it delivers an electrical energy provoking the switch to the deformed state of each element with shape memory 36 that can be activated by Joule effect, and the contraction thereof. Advantageously, the element (or elements) with shape memory 36 and/or the electrical power supply 38 are insulated to limit heat losses. As an example, they comprise a thermally insulating coating of elastomer, or a coating which takes the form of a sheet of fabric or of glass fibers, possibly reinforced.

To give an order of magnitude, the operation of deformation of the winglet 16 requires an energy of the order of a few hundreds of watts for a period of approximately one minute.

In addition to the activation mechanism 34, the winglet configuration changing device comprises a holding mechanism 40 configured to hold the winglet 16 in the second configuration, in the deformed state, despite the return forces induced by the aggregation of aerodynamic forces induced by the displacement of the winglet 16 and of the forces due to the elastic deformation of the winglet 16.

This holding mechanism 40 comprises at least one blocking cable 42, a tensioning system 44 for each blocking cable 42, at least one blocking system 46 configured to occupy a free state in which it does not immobilize the blocking cable (or cables) 42 and a blocked state in which it immobilizes the blocking cable (or cables) 42, the blocking system 46 occupying the blocked state without a contribution of energy and at least one activation system 48 configured to provoke a switch from the blocked state to the free state of the blocking system 46.

Each blocking cable 42 can be metal or made of synthetic fibers and must be extendible or quasi-extendible.

As an example, two stainless steel cables, each having a diameter of the order of 3 mm, are sufficient to hold the winglet 16 in the deformed state in the second configuration. For a length of the order of 2 m, the weight of these two blocking cables 42 is less than 0.3 kg.

Figure 6:
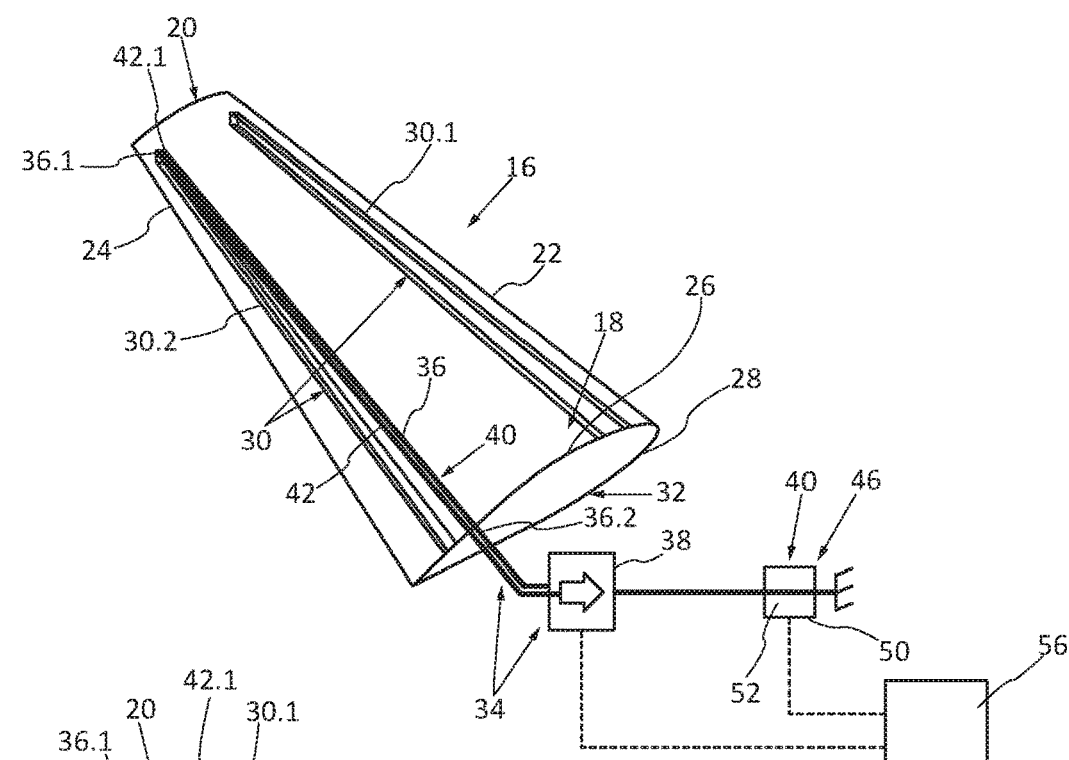
FIG. 6 is a perspective view of a winglet which illustrates a first embodiment.

According to an embodiment visible in FIG. 6, at least one blocking cable 42 is inserted into one of the elements with shape memory 36.

Figure 7:
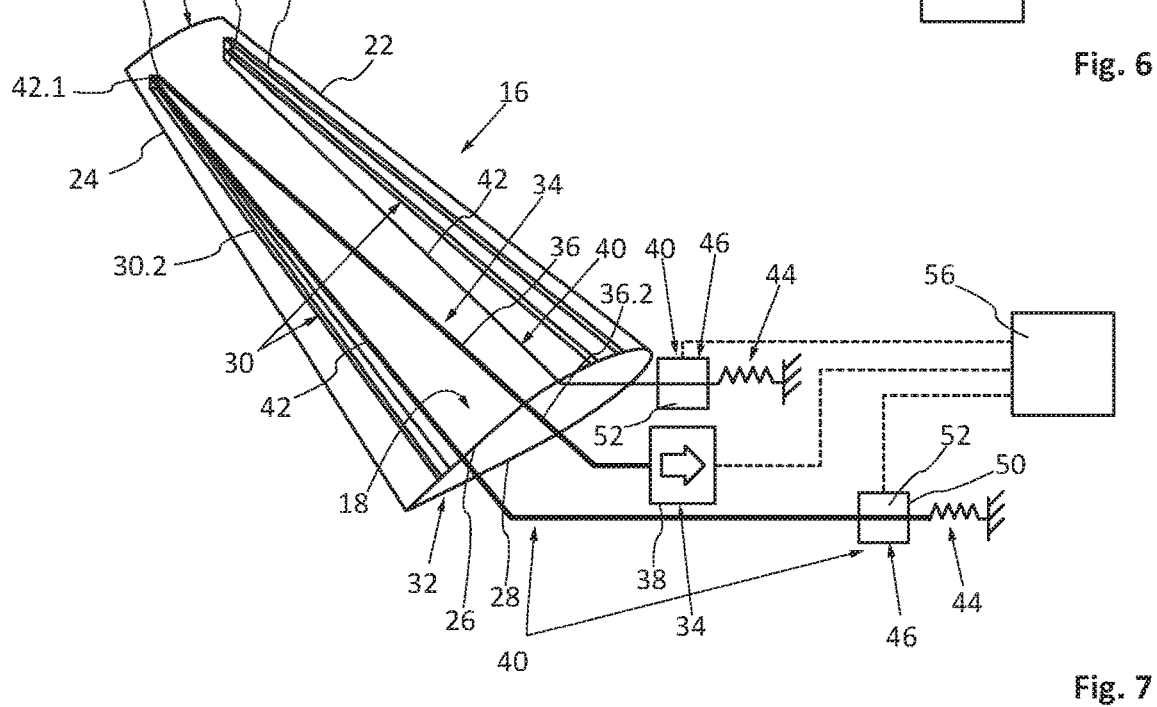
FIG. 7 is a perspective view of a winglet which illustrates a second embodiment.

According to an embodiment visible in FIG. 7, at least one blocking cable 42 follows a run different from the element (or elements) with shape memory 36.

Each blocking cable 42 comprises a first anchoring point 42.1 linked to the winglet, positioned in proximity to the free second end 20 of the winglet 16 and a portion 42.2 passing through the blocking system 46 which is positioned in proximity to the junction 19 linking the winglet 16 to the wing 14. The positions of the first anchoring point 42.1 and of the blocking system 46 are determined such that the blocking cable (or cables) 42 stretched between the first anchoring point 42.1 and the blocking system 46 holds (hold) the winglet in the second configuration.

The blocking system 46 is fixed to the winglet 16 (to the internal structure and/or to the skin of the winglet) or to the wing 14 by any appropriate means.

For each blocking cable 42, the tensioning system 44 is configured to hold the blocking cable 42 taut between the first anchoring point 42.1 and the blocking system 46, particularly upon the deformation of the winglet 16.

According to one embodiment, the element (or elements) with shape memory 36 can ensure the function of the tension system 44, more particularly when the blocking cable (or cables) 42 is (are) inserted into the element (or elements) with shape memory 36.

According to another embodiment, for each blocking cable 42, the tensioning system 44 is positioned opposite the first anchoring point 42.1 relative to the blocking system 46. It comprises a return element, such as a pulling spring for example, which links the second end 42.3 of the blocking cable 42 to the winglet 16 (to the internal structure and/or to the skin of the winglet) or to the wing 14.

According to another embodiment, for each blocking cable 42, the tensioning system 44 is positioned opposite the first anchoring point 42.1 relative to the blocking system 46. It comprises an actuator (winch, cylinder or the like) configured to pull on the blocking cable 42. According to this embodiment, the winglet 16 comprises no element with shape memory 36 and the blocking cable (or cables) 42 ensures (ensure) the function of the activation mechanism 34, the actuator (winch, cylinder or the like) making it possible to pull on the blocking cable (or cables) 42 to deform the winglet 16 and hold it (or them) taut.

The blocking system 46 comprises a substantially tight tank 50, passed through by at least one blocking cable 42, containing a material 52 configured to occupy a solid state (visible in FIG. 5B), when the temperature of the material is lower than its melting point, in which it immobilizes the blocking cable 42 which corresponds to the blocked state of the blocking system 46 and a liquid state (visible in FIG. 5A), when the temperature of the material is higher than its melting point, in which it does not immobilize the blocking cable 42 and allows the displacement thereof which corresponds to the free state of the blocking system 46.

According to another feature of the invention, the material 52 present in the tank 50 of the blocking system 46 has a melting point lower than the atmospheric temperature on the ground (at ground pressure) over most of the surface of the Earth and higher than the atmospheric temperature at the altitude of the aircraft during the cruising phase of the flight (at the atmospheric pressure at the altitude of the cruising phase of the flight). Thus, the nature of the material 52 ensures the function of the activation system 48 and allows the switching of the blocking system 46 from one state to the other.

According to one advantage, without a contribution of energy, the blocking system 46 occupies the blocked state and holds the winglet 16 in the second configuration, in the deformed state, during the cruising phase of the flight and occupies the free state and no longer holds the winglet 16 in the deformed state which automatically reverts to the first configuration during the take-off and landing phases of the flight. This feature makes it possible to reduce the quantity of energy needed to hold the winglet 16 in the deformed state.

The material 52 present in the tank 50 of the blocking system 46 and the blocking cable 42 are configured in such a way that a shear breaking stress between the material 52 and each blocking cable 42 lies between 2 and 7 MPa, the shear breaking stress corresponding to the stress from which each cable 42 can be displaced relative to the material 52 in solid phase.

According to one configuration, the tank 50 is configured in such a way that the immersed length of each blocking cable 42 in the material 52 is of the order of 100 to 150 mm According to one embodiment, the material 52 present in the tank 50 of the blocking system 46 is atmospheric ice. With such a material, it is possible to obtain a shear breaking stress of the order of 5 MPa, so that, with an immersed length of blocking cable of the order of 120 mm, it is possible to hold two blocking cables 42 with a diameter of the order of 3 mm taut under a force of 1200 DaN sufficient to hold a winglet 16 in the deformed state.

The shear breaking stress between the material 52 and each blocking cable 42 is gauged so as to obtain a switching of the winglet 16 from the second configuration to the first configuration when the loading of the wing of the aircraft exceeds a given threshold.

According to one advantage obtained by such a feature, the material 52 ensures a fuse function. Thus, when the loading of the wing exceeds the given threshold, this loading of the wing induces, at the interface between the material 52 and the blocking cables 42, a stress greater than the shear breaking stress so that the blocking cables 42 can be displaced relative to the material 52. Consequently, because of the initial elastic deformation of the winglet 16 to reach the second configuration, the latter reverts automatically to the first configuration, the blocking cables 42 no longer retaining it.

According to an embodiment visible in FIGS. 5A and 5B, the activation system 48 comprises a heating system 54, such as an electrical resistor for example, configured to provoke the melting of the material 52 and the switching thereof from the solid state to the liquid state. This activation system 48 makes it possible to provoke the melting of the material 52, the relaxing of the blocking cable (or cables) 42 and the return of the winglet 16 to the first configuration, to the non-deformed state, in case of particular flight conditions likely to generate an overload on the wing if the winglet 16 were to remain in the second configuration, in the deformed state. The heating system 54 also makes it possible to provoke the melting of the material 52 when it is necessary, in flight, to reactivate the activation mechanism 34 configured to deform the winglet 16.

The configuration changing device of the winglet comprises a controller 56 for coordinating the activation mechanism 34 configured to deform the winglet 16 and the activation system 48 of the holding mechanism 40 configured to hold the winglet 16 in the deformed state. This controller 56 is configured to automatically and independently trigger the change of configuration of each winglet as a function of a value of at least one criterion of loading of each wing 14. According to an embodiment given by way of indication, the controller 56 triggers the switching of the winglets 16 to the second configuration and the holding thereof in this configuration as long as the criterion of loading of the wings remains within a given range of values and provokes the return to the first configuration when the criterion of loading of the wings is outside of the given range of values.

As an example, the loading criterion can be a single datum such as an acceleration at a specific point of the aircraft determined by a local accelerometer or an inertial unit of the aircraft, a structural stress measured on a selected element by a strain gauge or a combination of several data, even flight parameters such as its speed, its orientation, etc.

For an aircraft, each winglet 16 comprises a configuration changing device, a single controller 56 making it possible to simultaneously control the configuration of the two winglets 16.

The operation of the configuration changing device of the winglet is now described.

On the ground, each winglet 16 occupies the first configuration (visible in FIGS. 3A and 4A) and, for each of them, the blocking system 46 of the blocking cables 42 is in the free state, as illustrated in FIG. 3A. After take-off, independently, the controller 56 triggers the change of configuration of each winglet 16 and the switching of the winglets 16 to the second configuration. This change of configuration could be triggered by the pilot. The activation system 48 of the holding mechanism 40 is activated by the controller 56 to provoke the melting of the material 52. In parallel, for each winglet 16, its activation mechanism 34 configured to deform it is activated, as illustrated in FIG. 3B.

With elements with shape memory 36, the electrical power supply 38 is activated by the controller 56.

By being deformed, the elements with shape memory 36 deform the winglets 16 which switch from the first configuration to the second configuration (visible in FIGS. 3B and 4B) and hold the blocking cables 42 in the taut state by running them through the blocking systems 46.

When the elements with shape memory 36 are completely deformed and the winglets 16 are deformed elastically and occupy the second configuration, the controller 56 provokes the deactivation of the activation system 48 of the holding mechanism 40. Consequently, for each blocking system 46, the material 52 switches to the solid state and blocks the blocking cables 42 which then hold the winglets 16 in the second configuration, as illustrated in FIGS. 3C and 4C. When the material 52 is in the solid state and holds the blocking cable (or cables) 46, the controller 46 provokes the deactivation of the electrical power supply 38.

Throughout the cruising phase of the flight, the winglets 16 are held in the second configuration without any contribution of energy.

In case of variation of the loading of the wings 14, for example because of a maneuver or turbulences, the criterion of loading of the wings can have a value outside of the given range of values. Consequently, the controller 56 independently and automatically provokes the return of the winglets 16 to the first configuration. To this end, the controller 56 triggers the activation of the activation system 48 of the holding mechanism 40 to provoke the melting of the material 52. Since the blocking cables 42 are no longer held, the winglets 16 naturally revert to the first configuration. This return of the winglets to the first configuration could be triggered by the pilot.

This return of the winglets 16 to the first configuration can also be provoked because of a loading of the wings exceeding a given threshold. In this case, the blocking cables 42 exert a stress greater than the shear breaking stress so that the blocking cables 42 can be displaced relative to the material 52 in the solid state.

When the criterion of loading of the wings returns to within the given range of values, the controller 56 triggers the change of configuration of each winglet 16 and the switching of the winglets 16 to the second configuration as previously described. This change of position could be triggered by the pilot.

Prior to landing, when the atmospheric temperature becomes higher than that of the melting point, the material 52 automatically becomes liquid and relaxes the blocking cables 42. Consequently, they no longer retain the winglets 16 in the second configuration, the winglets 16 automatically returning to the first configuration by virtue of their initial elastic deformation of the winglets 16.

If the landing takes place in a cold zone and the temperature does not drop below that of the melting point of the material 52, the controller 56, from a certain altitude, can trigger the return of the winglets 16 to the first configuration by activating the heating system of the material 52.

The invention provides the following advantages:

The configuration changing device according to the invention allows the winglets to occupy two configurations, a first configuration with little or no aerodynamic loading for all the wing dimensioning cases or at flight envelope limit, which makes it possible to avoid any overdimensioning of the wings and a second configuration making it possible to reduce the drag of the wings in the flight phases in which the latter are weakly loaded.

The configuration changing device according to the invention has little bulk and is lightweight, its weight being less than 5 kg for each winglet.

It makes it possible to hold the winglets in the deformed state without a contribution of energy.

Finally, it allows for safe operation in so far as the material 52 ensures the natural and gauged fuse function in case of untimely overloadings of the wings.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A winglet linked to a wing of an aircraft and equipped with a configuration changing device, the winglet being configured to be deformed elastically between a first configuration in an absence of an activation loading and a second configuration in a presence of an activation loading, the configuration changing device comprising:
    an activation mechanism configured to occupy a non-activated state in which the activation mechanism exerts no loading on the winglet and an activated state in which the activation mechanism exerts the activation loading so as to deform the winglet from the first configuration to the second configuration, and
    a holding mechanism configured to hold the winglet in the second configuration,
    wherein the holding mechanism comprises:
        at least one blocking cable which has a first anchoring point linked to the winglet,
        at least one blocking system passed through by the blocking cable and configured to occupy a free state in which the at least one blocking system does not immobilize the blocking cable and a blocked state in which the at least one blocking system immobilizes the blocking cable,
        the first anchoring point and the blocking system being positioned in such a way that the blocking cable stretched between the first anchoring point and the blocking system is configured to hold the winglet when the latter occupies the second configuration,
        the blocking system comprising a tank containing a material having a melting point and configured to occupy a solid state, when a temperature of the material is lower than the melting point, in which the material immobilizes the blocking cable which corresponds to the blocked state of the blocking system and a liquid state, when the temperature of the material is higher than the melting point, in which the material does not immobilize the blocking cable and allows a displacement thereof which corresponds to the free state of the blocking system.

2. The winglet according to claim 1, wherein the material is chosen such that the melting point is lower than an atmospheric temperature at ground level and higher than an atmospheric temperature at an altitude of the aircraft during a cruising phase of a flight.

3. The winglet according to claim 1, wherein the material present in the tank and the blocking cable are configured in such a way that a shear breaking stress between the material and each blocking cable is gauged so as to obtain a switching of the winglet from the second configuration to the first configuration when a loading of the wing of the aircraft exceeds a given threshold.

4. The winglet according to claim 3, wherein the material is atmospheric ice and wherein the holding mechanism comprises two blocking cables which each have a diameter of the order of 3 mm and a length immersed in the material of the order of 100 to 150 mm.

5. The winglet according to claim 1, wherein the holding mechanism comprises an activation system configured to melt the material.

6. The winglet according to claim 1, wherein the holding mechanism comprises a tensioning system for each blocking cable.

7. The winglet according to claim 1, wherein the activation mechanism comprises at least one element with shape memory that can be activated by Joule effect, configured to occupy a non-deformed state and a deformed state in which the at least one element generates the activation loading and at least one electrical power supply configured to deliver an electrical energy to the element with shape memory to provoke a switch from the non-deformed state to the deformed state.

8. The winglet according to claim 7, wherein the element with shape memory is activated by heating.

9. The winglet according to claim 7, wherein the at least one blocking cable is inserted into the at least one element with shape memory.

10. The winglet according to claim 7, wherein at least one blocking cable follows a different run from the at least one element with shape memory.

11. The winglet according to claim 1, wherein the configuration changing device comprises, for each blocking cable, an actuator linked to a second end of the blocking cable, positioned opposite the first anchoring point relative to the blocking system and configured to pull on the blocking cable.

12. The winglet according to claim 1, wherein the configuration changing device comprises a controller for coordinating the activation mechanism configured to deform the winglet into a deformed state and the holding mechanism configured to hold the winglet in the deformed state.

13. The winglet according to claim 12, wherein the controller is configured to automatically and independently trigger a change of configuration of the winglet as a function of a value of at least one criterion of loading of each wing.

14. The winglet according to claim 1 wherein the aircraft comprises wings, each wing provided with at least one winglet.

* * * * *